(12) United States Patent
Shapiro et al.

(10) Patent No.: US 7,490,334 B2
(45) Date of Patent: Feb. 10, 2009

(54) RESOURCE ADAPTER WITH MODULAR SYSTEM MANAGEMENT INTERFACE

(75) Inventors: Ari Shapiro, Beit Shemesh (IL); Alon Lahav, Rishon Lezion (IL)

(73) Assignee: Sun Microsystems, Inc., Santa Clara, CA (US)

( * ) Notice: Subject to any disclaimer, the term of this patent is extended or adjusted under 35 U.S.C. 154(b) by 1383 days.

(21) Appl. No.: 10/132,437

(22) Filed: Apr. 25, 2002

(65) Prior Publication Data

US 2003/0204740 A1   Oct. 30, 2003

(51) Int. Cl.
*G06F 3/00*   (2006.01)
*G06F 7/00*   (2006.01)
(52) U.S. Cl. .......................................... 719/328; 707/10
(58) Field of Classification Search .................. 709/246, 709/201–207, 217–219; 717/120–121; 719/311–332; 707/1–10
See application file for complete search history.

(56) References Cited

U.S. PATENT DOCUMENTS

| | | | | |
|---|---|---|---|---|
| 6,256,676 | B1 * | 7/2001 | Taylor et al. | 709/246 |
| 6,332,163 | B1 * | 12/2001 | Bowman-Amuah | 709/231 |
| 6,597,956 | B1 * | 7/2003 | Aziz et al. | 700/3 |
| 6,742,015 | B1 * | 5/2004 | Bowman-Amuah | 718/101 |
| 6,757,689 | B2 * | 6/2004 | Battas et al. | 707/101 |
| 6,757,899 | B2 * | 6/2004 | Zhdankin et al. | 719/315 |
| 6,816,882 | B1 * | 11/2004 | Conner et al. | 709/203 |
| 6,999,956 | B2 * | 2/2006 | Mullins | 707/2 |
| 2002/0194244 | A1 * | 12/2002 | Raventos | 709/101 |
| 2003/0097574 | A1 * | 5/2003 | Upton | 713/183 |
| 2003/0145074 | A1 * | 7/2003 | Penick | 709/223 |
| 2003/0225944 | A1 * | 12/2003 | Mousseau et al. | 710/1 |

OTHER PUBLICATIONS

Dennis Kennedy, "Connection Pooling with SQL Server 2000 Analysis Services", (Microsoft Corporation, Originally published May 2001, updated Nov. 2002, p. 1).*
Rahul Sharma, "Java™ 2 Enterprise Edition; J2EE™ Connector Architecture Specification," version 1.0, Final Release, Aug. 22, 2001, 188 pages.
David Alpher, "Tracking Down J2EE", printed from Ebiz http://e-serv.ebizq.net/aps/alpher_1.html on Jan. 3, 2002, 5 pages.

(Continued)

*Primary Examiner*—Meng-Ai An
*Assistant Examiner*—Charles E Anya
(74) *Attorney, Agent, or Firm*—Robert C. Kowert; Meyertons, Hood, Kivlin, Kowert & Goetzel, P.C.

(57) ABSTRACT

A resource adapter may include modular system management interface for providing an interface between server-provided management services and back-end systems. Enterprise servers may provide management services and may host application components implementing business logic. Back-end systems may provide resources to the application components. The servers may provide services to the back-end systems to enhance efficiency, scalability, and security. Resource adapters interfacing these systems may include service adapter modules to interface between the servers and the back-end systems. For each service that a server provides to a back-end system, the corresponding resource adapter may include a service adapter module installed in the resource adapters modular system management interface. The service adapter module may isolate the code that may interact the service. The modularity may allow the resource adapter to be deployed in heterogeneous enterprise frameworks including J2EE compliant frameworks and non-J2EE compliant frameworks.

35 Claims, 9 Drawing Sheets

OTHER PUBLICATIONS

David Alpher, "The Application Server State of the Union", printed from Ebiz http://e-serv.ebizq.net/aps/alpher_2.html on Jan. 3, 2002, 11 pages.

Dirk Reinshagen, "A Look at the J2EE Connector Architecture," JavaWorld, Nov. 21, 2001, 7 pages.

Rahul Sharma, "J2EE™ 2 Connector Architecture Specification," Java 2 Platform, Enterprise Edition, 1995-2001, 6 pages.

Theo Stolker, WRQ, "Why You Need to Look at the J2EE Connnector Architecture in 2001," Jun. 18, 2001, printed from ebiz at http://e-serv.ebizq.net/aps/stolker_1.html, 5 pages.

* cited by examiner

RESOURCE ADAPTER WITH MODULAR SYSTEM MANAGEMENT INTERFACE

BACKGROUND OF THE INVENTION

1. Field of the Invention

The present invention relates to the field of application servers, and more particularly to systems and methods for interfacing between enterprise information systems or back-end systems and application servers or other applications.

2. Description of the Related Art

Enterprise applications may access functions and data associated with applications running on back-end systems. A back-end system may provide information infrastructure for an enterprise by offering a set of services to enterprise applications. These services may be exposed to client applications as local and/or remote interfaces. Examples of back-end systems may include, but are not limited to, enterprise resource planning (ERP) systems providing business objects to client applications, mainframe transaction processing (TP) systems providing transaction programs to client applications, customer relationship management (CRM) systems, and legacy database systems providing records to client applications.

An application server collaborates with back-end systems to keep system-level mechanisms (e.g. transaction management, security, and connection management) transparent from the enterprise applications. As a result, an enterprise application provider may focus on the development of business and presentation logic for its application components and need not get involved in the system-level issues related to back-end system integration. This may lead to an easier and faster cycle for the development of scalable, secure, and transactional enterprise applications that require connectivity with multiple back-end systems.

Figure 1:
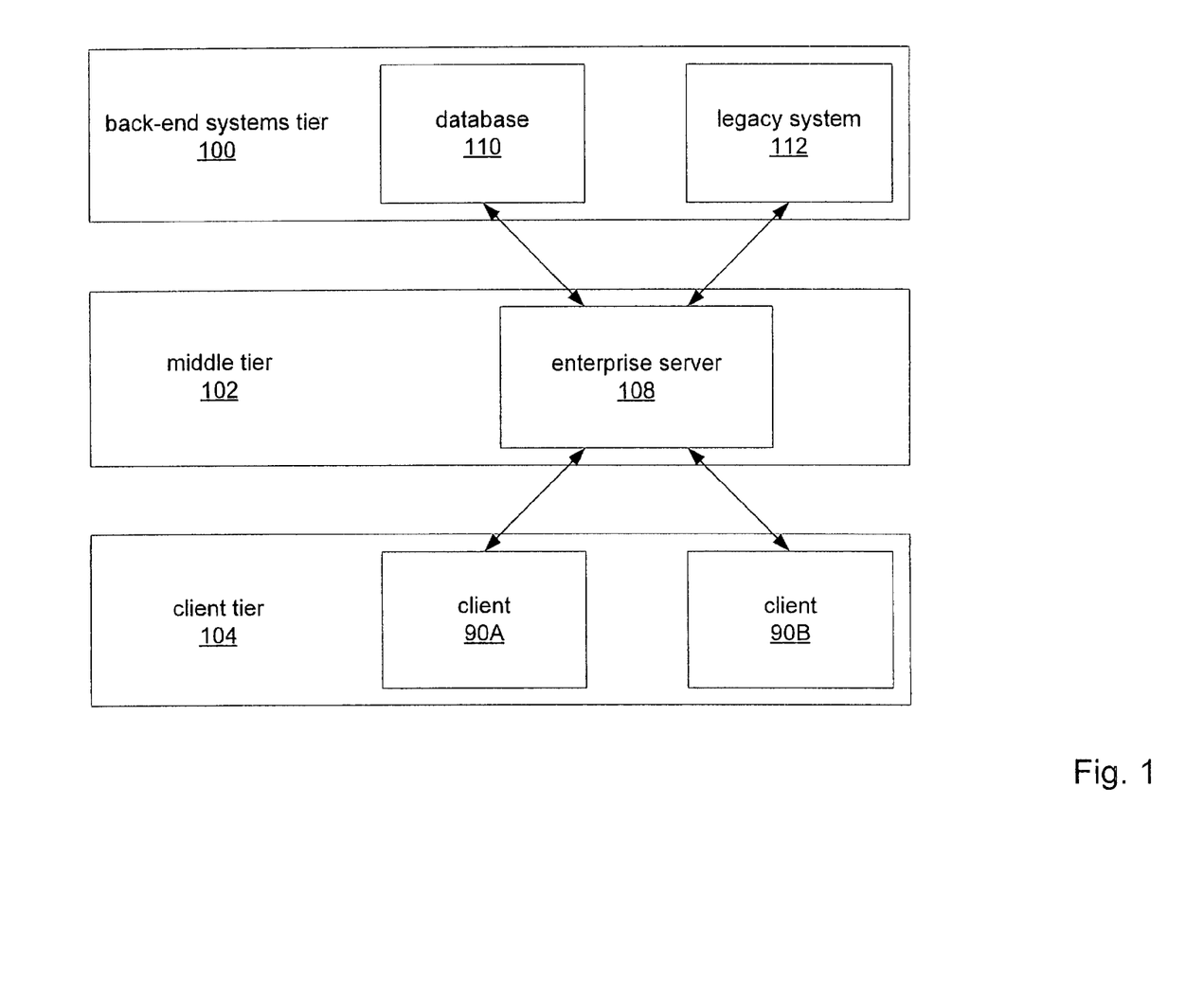
FIG. 1 illustrates a typical three-tier enterprise application system.

FIG. 1 illustrates a typical three-tier enterprise application system. Client tier 104 comprises clients 90A and 90B which access middle tier 102 for content. Clients 90A and 90B may be networked devices such as desktop computers, cellular devices, and/or personal digital assistants. In middle tier 102, enterprise server 108 provides content to clients 90A and 90B. Enterprise server 108 may comprise applications that apply business and presentation logic to data and functionality from back-end systems tier 100. Enterprise server 108 may comprise a web server and/or an application server. Enterprise server 108 may comprise a cluster of servers. Middle tier 102 may provide management services to back-end systems tier 100. Examples of management services include, but are not limited to, a connection pooling service, a transaction management service, and a security management service. Back-end systems tier 100 may be comprised of heterogeneous enterprise information systems including database 110 and legacy system 112. Database 110 and legacy system 112 may provide enterprise server 108 with data and functionality. Database 110 and legacy system 112 may use the management services provided by enterprise server 108. Enterprise server 108 may interface with database 110 and legacy system 112 using a resource adapter. The resource adapter may provide database 110 and legacy system 112 an interface for accessing the management services provided by a server of middle tier 102.

A resource adapter is a system-level software driver that is used by an application to connect to a back-end system. The resource adapter provides connectivity between the back-end system, the application server, and the enterprise application. Prior to the establishment of the Java Connector Architecture (JCA) of Java 2, Enterprise Edition (J2EE), enterprise application integration vendors produced proprietary resource adapters built to work with their products. Thus, a different resource adapter existed not only for each different back-end system, but also for each different application server.

The JCA is an architecture for integration of J2EE compliant servers with back-end systems. There are two parts to the JCA: a back-end system vendor-provided resource adapter and an application server that allows this resource adapter to plug in. The JCA defines a set of contracts (e.g., transactions, security, and connection management) that a resource adapter must support to plug into an application server. The JCA includes a standard deployment and packaging protocol for resource adapters.

A resource adapter conforming to the JCA includes a common client interface (CCI) and a service provider interface (SPI). The CCI provides a back-end system independent application programming interface (API) for coding function calls identifying a native back-end system function to call, specifying input data to the back-end system, and processing output data from the back-end system. The SPI integrates the transaction, security and connection management facilities of an application server with those of a transactional resource manager, for example. The SPI provides the back-end system with access to the application server's management services.

Resource adapters conforming to the JCA are used in two environments: a managed environment and a non-managed environment. A managed environment defines an operational environment for a J2EE-based, multi-tier, web-enabled application that accesses back-end systems. The application may include of one or more application components that are deployed on application server containers. The containers can be web containers that host Java server pages, servlets, and static HTML pages; enterprise Java beans (EJB) containers that host EJB components; or application client containers that host standalone application clients. In a managed environment, the application server must comply with J2EE and JCA to provide a complete set of management services including a transaction management service, a connection management service, and a security management service.

A non-managed environment defines an operational environment for a two-tier application. An application client directly uses a resource adapter to access the back-end system, which defines the second tier for a two-tier application. No management services are provided through a server to the back-end system.

Figure 2:
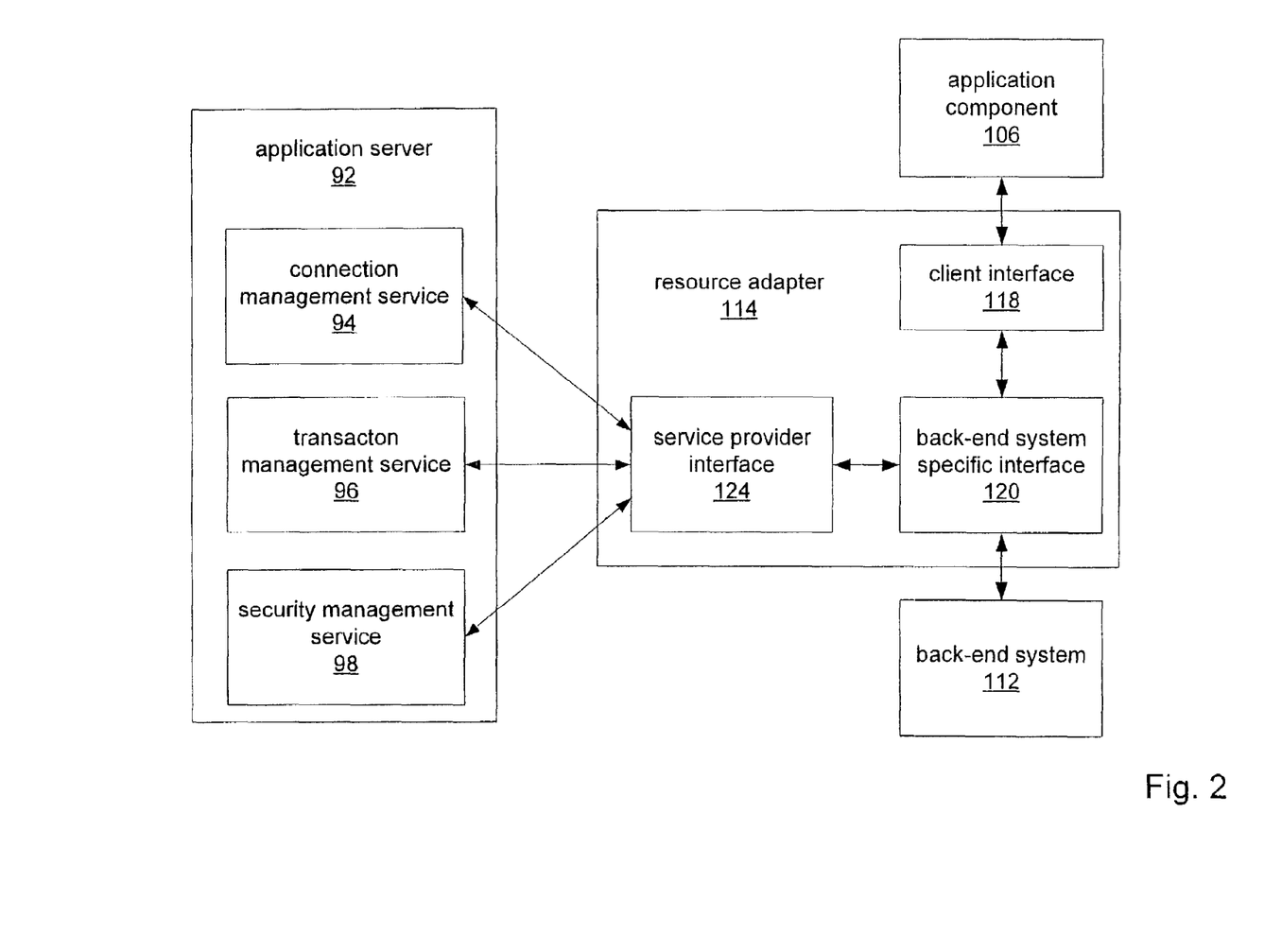
FIG. 2 illustrates a typical resource adapter implemented according to the Java Connector Architecture of Java 2, Enterprise Edition.

FIG. 2 illustrates a typical resource adapter 114 implemented according to the Java Connector Architecture of Java 2, Enterprise Edition. In a fully managed environment, resource adapter 114 allows interaction between application component 106, J2EE compliant application server 92, and back-end system 112 through client interface 118, service provider interface 124, and back-end system specific interface 120. Service provider interface 124 must be implemented according to the Java Connector Architecture (JCA). Service provider interface 124 provides the back-end system access to management services provided by application server 92. Application server 92 must provide management services specified by the JCA including connection management service 94, a transaction management service 96, and a security management service 98. Client interface 118 may be implemented according to the JCA's Common Client Interface (CCI). Client interface 118 provides application component 106 access to functionality from back-end system 112 and data from back-end system 112. Application server 92 may host application component 106 within an application component container, or application component 106 may comprise an autonomous application. Back-end system specific interface 120 is particular to each different back-end system. Back-end system interface 120 allows back-end system 112 to communicate and use management services through client interface 118 and service provider interface 124 respectively. In the non-managed case, there is no server 92 providing management services to back-end system 112.

The JCA does not support connectivity between a server and back-end systems if the server does not fall into the managed environment or non-managed environment category. Thus, other than in completely non-managed environments, a standard resource adapter may not be available for systems that do not provide for a fully managed environment with a J2EE-compliant application server as required by JCA.

SUMMARY OF THE INVENTION

A resource adapter with a modular system management interface may allow various management services provided by a server to be applied to access between applications and a back-end system. Enterprise information servers may provide content to client applications. The servers may host application components for producing the content. For example, the servers may include, but are not limited to, application servers and/or web servers; the application components may include, but are not be limited to, Enterprise Java Beans, applets, and/or servlets. The application components may include the business and presentation logic to provide content to client applications. Back-end systems may provide resources to the application components. For example, back-end systems may include, but are not limited to a Customer Information Control System (CICS) system, an R/3 system, and/or a PeopleSoft system. The servers may provide management services for access between the application and the back-end systems to enhance efficiency, scalability, and security. For example, management services may include connection pooling, transaction management, and/or security management.

Resource adapters interfacing these systems may include service adapter modules to interface between the servers and the back-end systems. For each service that a server provides to a back-end system, the corresponding resource adapter may include a service adapter module installed in the resource adapter's modular system management interface. The service adapter module may be an isolated code module that may interface to the service. The service adapter may include a well-defined interface. The modularity may allow the resource adapter to be deployed in heterogeneous enterprise frameworks including J2EE compliant frameworks and non-J2EE compliant frameworks.

An enterprise information system may include application components that implement business logic and presentation logic to provide content to networked client applications coupled to a server. The application components may use data and functionality provided by back-end systems. The server may provide system management services to the back-end systems for reasons of efficiency, scalability and security. A resource adapter may couple an application component, a server, and a back-end system. The resource adapter may provide an interface for the application component to access functions or data of the back-end system. The resource adapter may include a system management interface module for each system management service provided by the server to the back-end system. The system management interface module may provide an interface to the system management service for applying the system management service to accesses between the application and the back-end system.

A resource adapter may include an interface to a back-end system, an interface to an application that may access the back-end system's functions/data, and a modular system management interface to a server. The server may provide one or more system management services. The modular system management interface may include one or more service adapter sockets. Each service adapter socket may be configured to host a system management interface module that provides an interface to a system management services for applying the system management service to accesses between the application and the back-end system.

A method for providing connectivity between one or more enterprise applications, servers and back-end systems, may include deploying a resource adapter for each back-end system. Each resource adapter deployed may provide a standard interface for enterprise applications to access functions or data in the corresponding back-end system. The method may also include determining what system management services are provided by a server coupled to the back-end systems and deploying one or more system management interface modules for each resource adapter. A different system interface module may be deployed with the resource adapter for each system management service provided by the server. Each system management interface module may be deployed as a separate pluggable module to its corresponding resource adapter for providing an interface to one of the system management services.

BRIEF DESCRIPTION OF THE DRAWINGS

A better understanding of the present invention can be obtained when the following detailed description is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

An enterprise information system may include a server (e.g. a web server, an application server), application components that may produce content, and back-end systems that may provide data and functionality to the application components. The server may provide system management services to apply to access between the application components and the back-end systems. Resource adapters may couple applications, servers, and back-end systems. Each resource adapter may provide an interface for an application to access a function or data of a back-end system. In one embodiment, a resource adapter may include system management interface modules in a modular system management interface. Each system management interface module may provide an interface to a different system management service for applying the system management service to accesses between an application and a back-end system.

Figure 3:
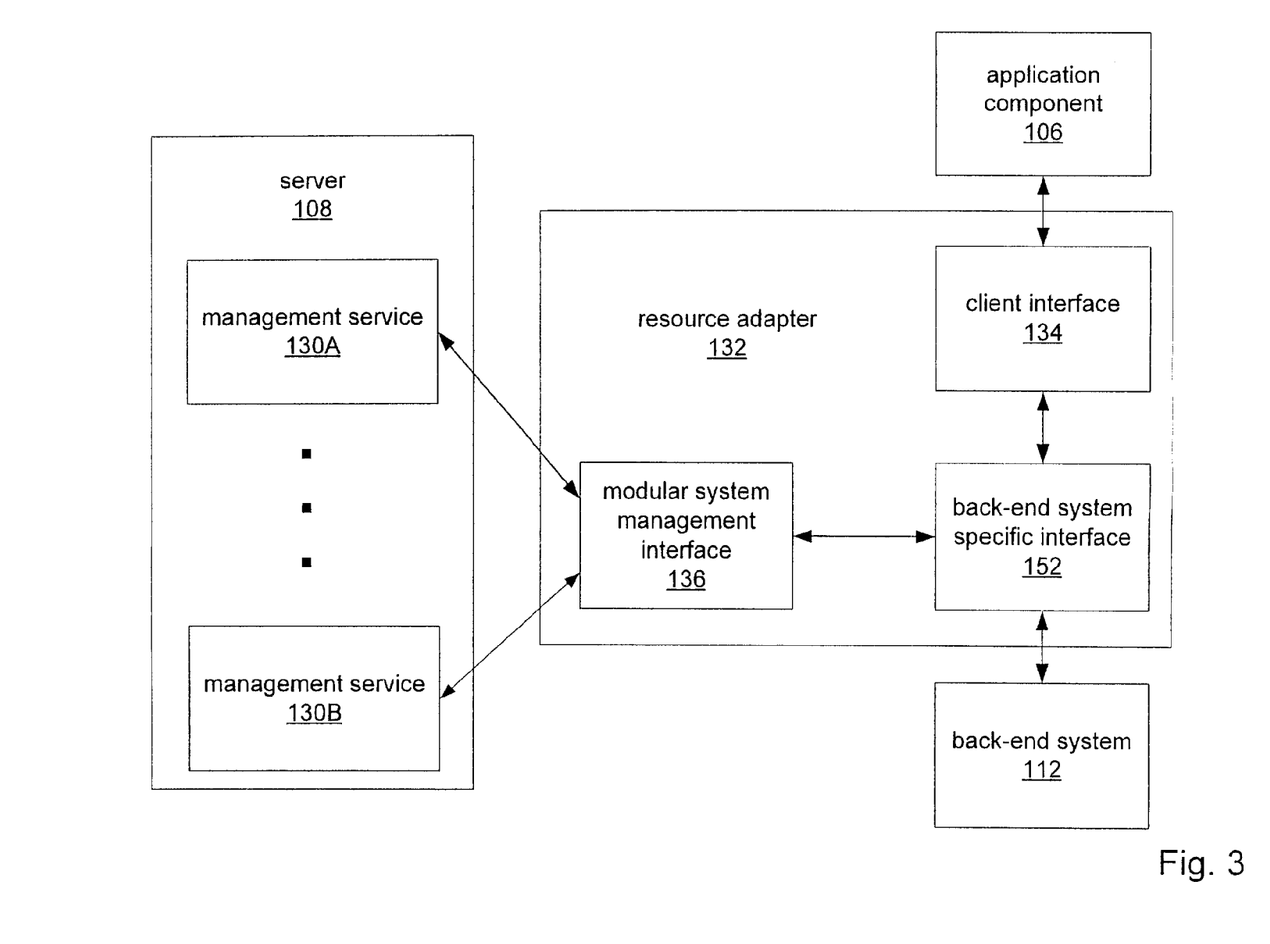
FIG. 3 illustrates a system including a resource adapter with a modular system management interface, according to one embodiment.

FIG. 3 illustrates a resource adapter with a modular system management interface according to one embodiment. Resource adapter 132 may allow interaction among server 108, application component 106, and back-end system 112. Server 108 may comprise a computing system coupled to a network. Server 108 may provide content to clients coupled to the network. For example, server 108 may be an application server (e.g. iPlanet Application Server, BEA WebLogic, Borland Application Server, IBM WebSphere) and/or web server (e.g. iPlanet Web Server, Apache). Server 108 may host one or more application components such as application component 106 within an application component container. For example, the application components may include, but are not limited to, Enterprise Java Beans, applets, and/or servlets. The application components such as application component 106 may include the business and presentation logic to provide content to web clients. In another embodiment some application components may be independent of server 108.

Server 108 may provide management services 130A and 130B among others for applying the management services to accesses between application components and one or more back-end systems such as back-end system 112. Back-end systems may include, but are not limited to, a Customer Information Control System (CICS) system, an R/3 system, an ERP system, and/or a PeopleSoft system, for example. Management services 130A and 130B may include, but are not limited to a connection pooling service, a transaction management service, and/or a security management service. Note that no particular number of management services are required in the server. Server 108 may provide only one such management service, or may provide more than one management service. In some embodiments, server 108 may not provide all the services required by J2EE. In other embodiments, server 108 may be J2EE compliant, server 108 may provide services not mentioned in the J2EE standard, or server 108 may provide some services that perform functions mentioned in the J2EE standard but is not fully J2EE compliant. A system management interface module may be included within modular system management interface 136 for each management service offered by server 108. Each system management interface module may plug into a socket in modular system management interface 136. Modular system management interface 136 may couple to back-end system specific interface 152 to provide support to back-end system 112. In one embodiment, back-end system specific interface 152 may comprise a system-level software driver provided by the vendor of back-end system 112. Client interface 134 may couple to back-end system specific interface 152 to provide application components 106 with access to functionality and data provided by back-end system 112. In one embodiment, client interface 134 may be implemented the same as or similar to the client interface for JCA resource adapters.

In one embodiment, resource adapters with modular system management interfaces may be used in a framework that may not be supported by J2EE, such as a server framework in which less than the full set of J2EE/JCA management services are provided, e.g., a semi-managed framework. The resource adapters may be used in the framework of non-J2EE compliant servers. For example, a resource adapter may be used with a web server such as iPlanet Web Server that may provide some level of management but may not provide the same level of management that J2EE may specify. The resource adapter may be used in such semi-managed frameworks by isolating the code that interacts with the server's management services in system management interface modules that each may include a well-defined interface to a particular management service. These system management interface modules may be implemented differently for each different system management service. For example, the system management interface modules may allow resource adapters to be deployed for a back-end system that may desire a connection pooling mechanism (e.g. a relational database system) to interface with both an application server that may implement a fully J2EE compliant connection pooling mechanism (e.g. iPlanet Application Server) and a server that may implement a connection pooling mechanism that may not be fully J2EE compliant (e.g. a web server).

Figure 4:
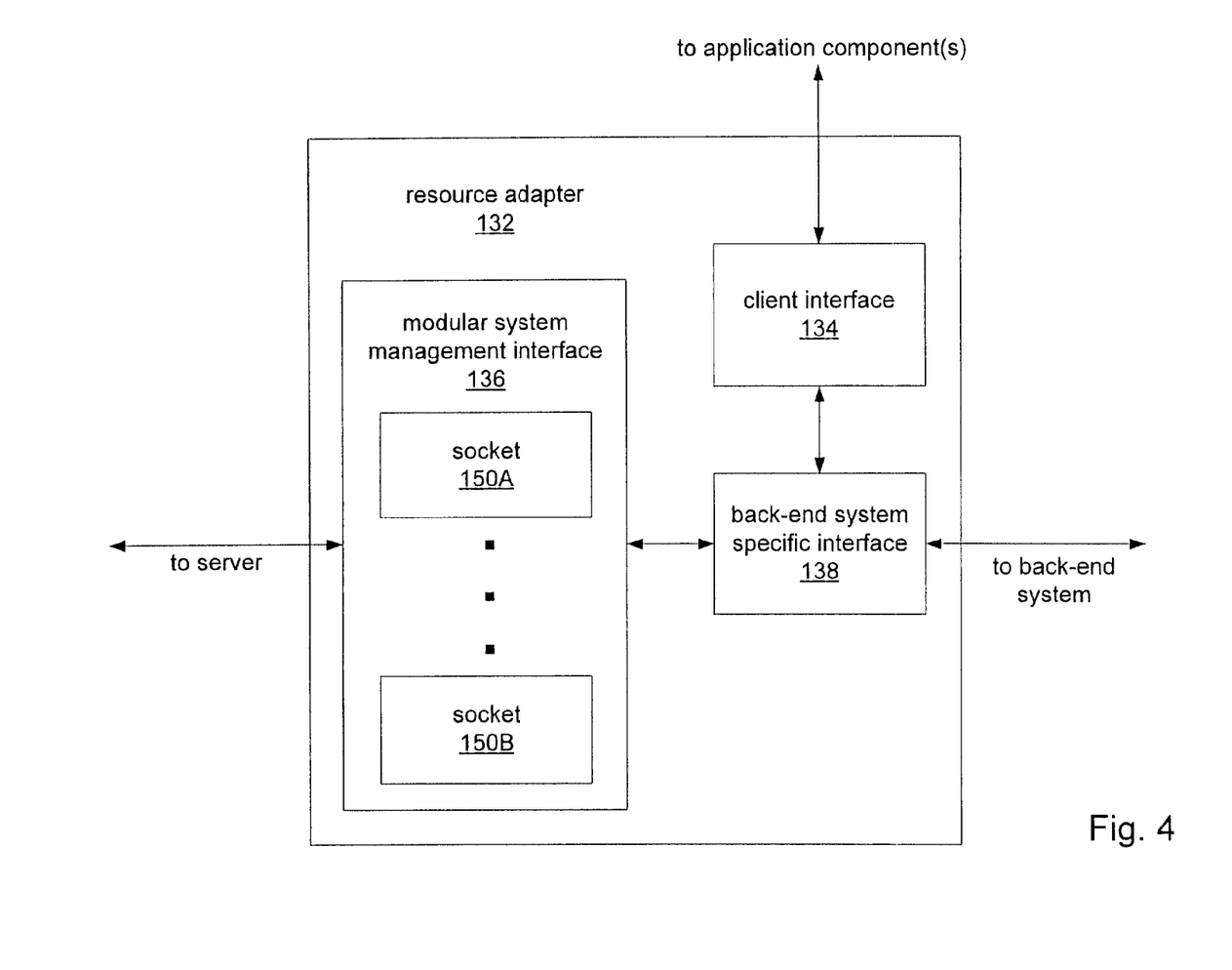
FIG. 4 illustrates a resource adapter including a modular system management interface, according to one embodiment.

FIG. 4 illustrates a resource adapter comprising a modular system management interface according to one embodiment. Modular system management interface 136 may include one or more sockets such as sockets 150A and 150B. Sockets 150A and 150B may interface with back-end system specific interface 132 for applying the system management services (e.g. connection pooling, transaction management, and security management) to accesses between an application and back-end system 112. One or more system management interface modules may be plugged into sockets 150A and 150B to provide modular interfaces to particular management services provided by the server. Each system management interface module plugged into socket 150A or 150B may interface back-end system specific interface 132 with a particular system management service. Depending on the system configuration (e.g. what services are provided by the server), modular system management interface 136 may include one or more "empty" sockets into which no system management interface modules are currently installed. In various embodiments, modular system management interface 136 may comprise any number of sockets into which corresponding modules may be installed depending on the services provided by a server for which the resource adapter is deployed.

In one embodiment, a resource adapter with a modular system management interface may interface the same back-end system with servers differing according to the server's management services. The resource adapter's configuration for the different servers may vary only in which system management interface modules are installed in the modular system management interface. Among the servers, the client interface and back-end specific interface may not change.

Figure 5A:
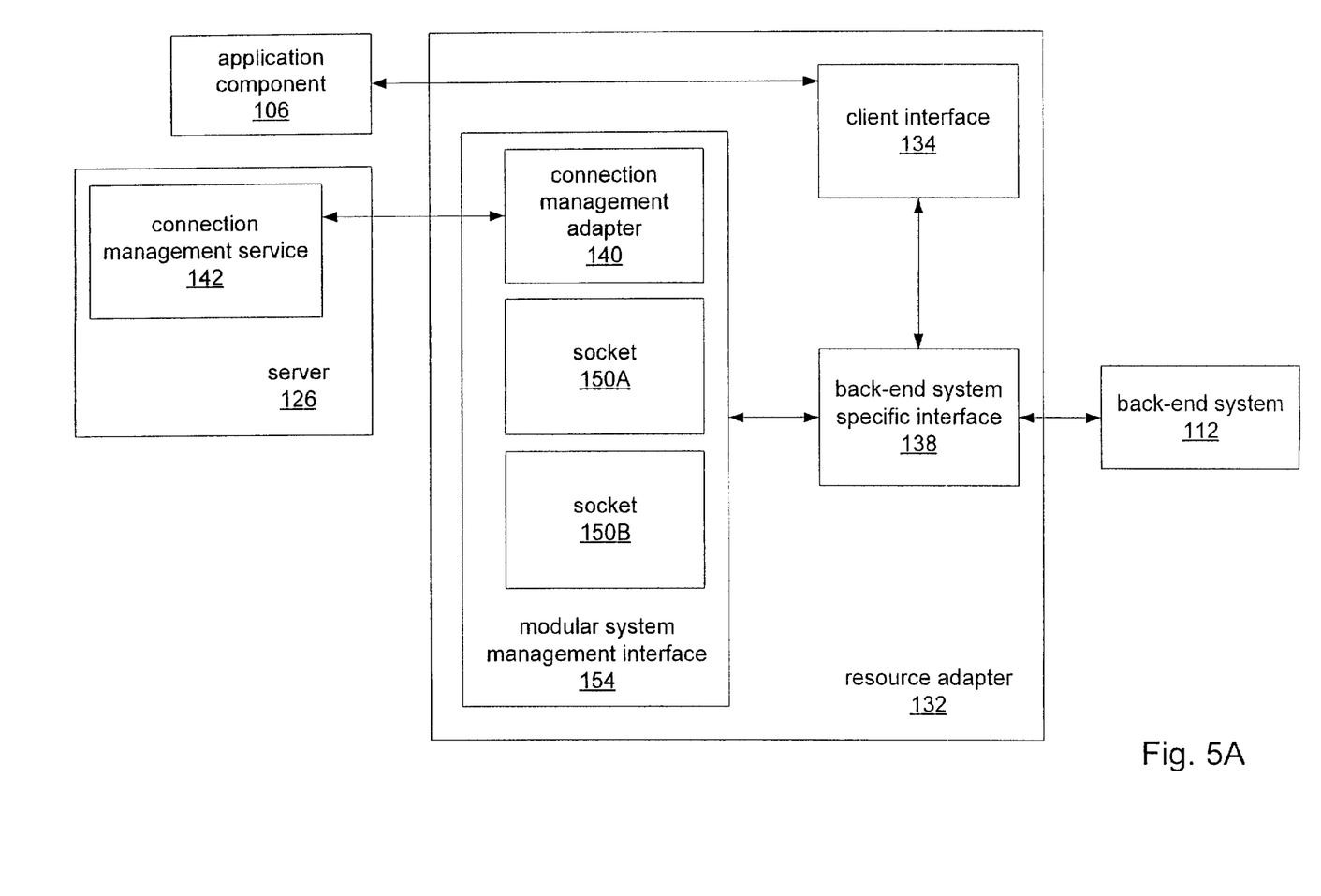
FIG. 5A shows a configuration for a modular system management interface including system management interface modules plugged into sockets, according to one embodiment.
Figure 5B:
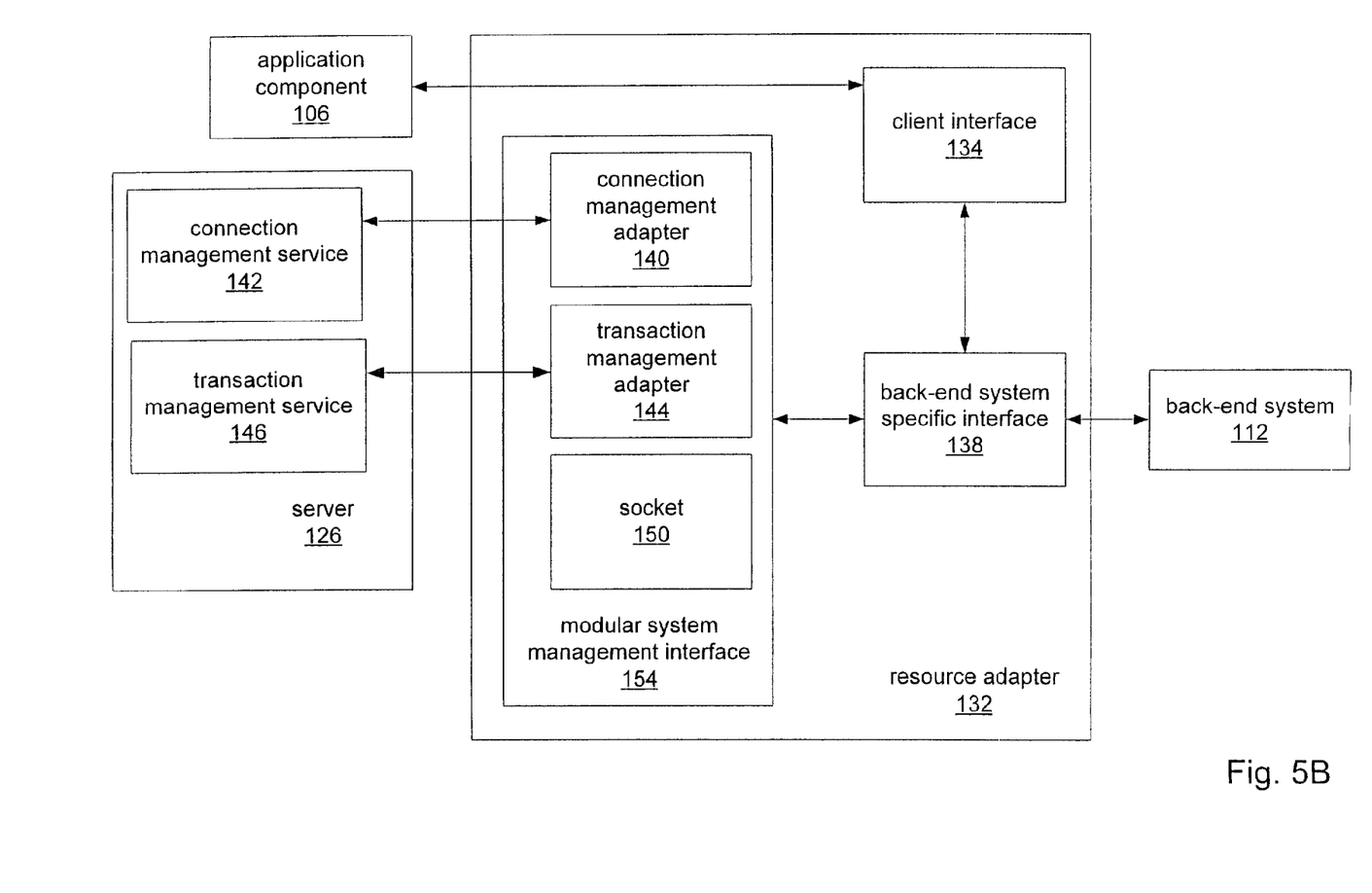
FIG. 5B shows a configuration for a modular system management interface including system management interface modules plugged into sockets, according to one embodiment.
Figure 5C:
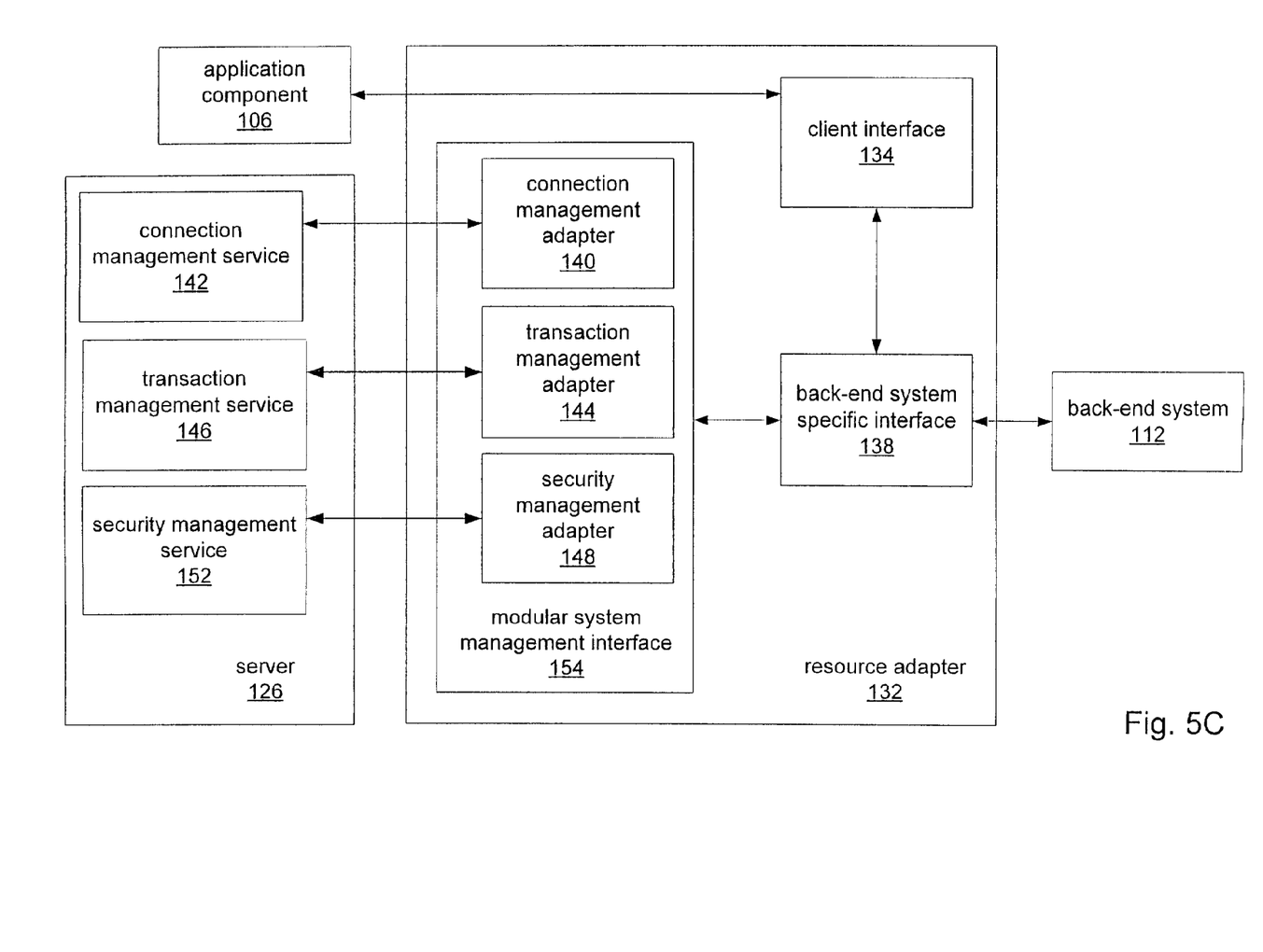
FIG. 5C shows a configuration for a modular system management interface including system management interface modules plugged into sockets, according to one embodiment.

FIGS. 5A, 5B, and 5C show various configurations for a resource adapter having a modular system management interface, according to some embodiment. As indicated in FIG. 5A, server 126 may host connection management service 142, but not other management services. Resource adapter 132 may be configured to provide services from connection management service 142 to back-end system 112 through connection management adapter module 140. Thus, resource adapter 132 may be configured to support the particular management service provided by the server without requiring that the server provide other management services.

As indicated in FIG. 5B, a different server may also include a transaction management service 146. Resource adapter 132 may be configured with a connection management adapter module 140 and a transaction management adapter module 144 to provide access to both connection management service 142 and transaction management service 146. In one embodiment, connection management adapter module 140 and a transaction management adapter module 144 may be installed as separate isolated program modules within resource adapter 132.

As indicated in FIG. 5C, another server may additionally include security management service 152. Resource adapter 132 may be configured with a connection management adapter module 140, a transaction management adapter module 144, and a security management adapter module 148 to provide access to the three management services provided by the server. In one embodiment, connection management adapter module 140, a transaction management adapter module 144, and security management adapter module 148 may be installed as separate isolated program modules within resource adapter 132.

In one embodiment, the only difference between the resource adapters of FIGS. 5A, 5B and 5C may be the configuration of the system management interface modules. Resource adapter 132 may be configured to match the management services that the server provides to the back-end system. Among the different configurations illustrated by FIGS. 5A, 5B, and 5C the same resource adapter may be used, but the resource adapter may have different modules installed in the modular system management interface.

Figure 6:
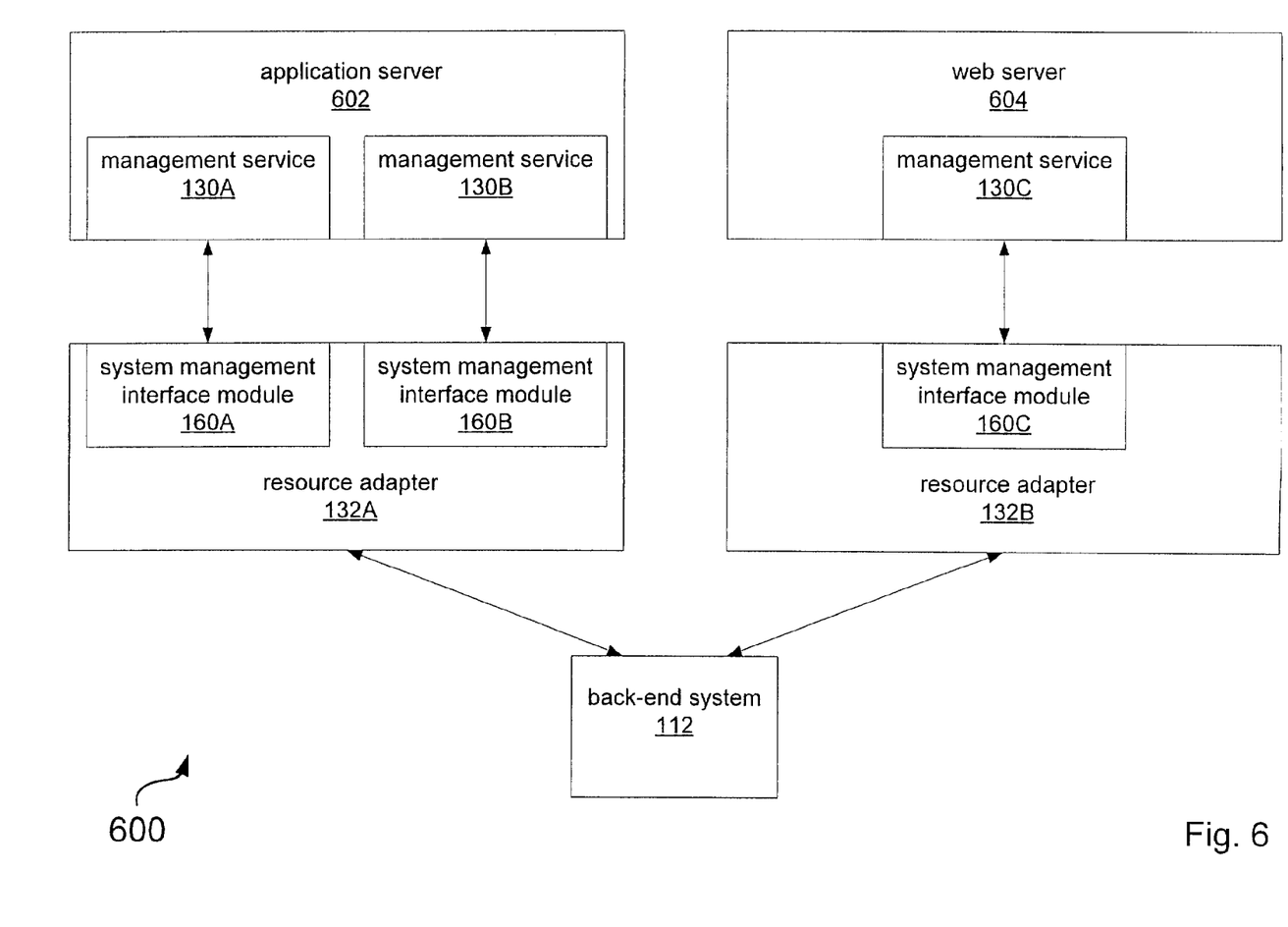
FIG. 6 illustrates an enterprise system including an application server, a web server, resource adapters for two different configurations of management services and a back-end system, according to one embodiment.

Resource adapters applying different system management services to accesses between applications and the same back-end system may differ only in the configuration of the system management interface module modules installed in each resource adapter's modular system management interface. FIG. 6 illustrates an enterprise system 600 including an application server 602, a web server 604, and resource adapters 132A and 132B interfacing the two configurations of management services with a back-end system according to one embodiment. Resource adapters 132A and 132B include different modules for interfacing system management services 160A, 160B, and 160C with back-end system 112. Resource adapters 132A and 132B may have identical client interfaces and back-end specific interfaces.

In one embodiment, resource adapters across different enterprise information systems may differ only in the system management interface modules installed in the modular system management interfaces. Hence, methods for deploying the resource adapters may include determining the servers' system management services and deploying the appropriate system management interface modules.

Figure 7:
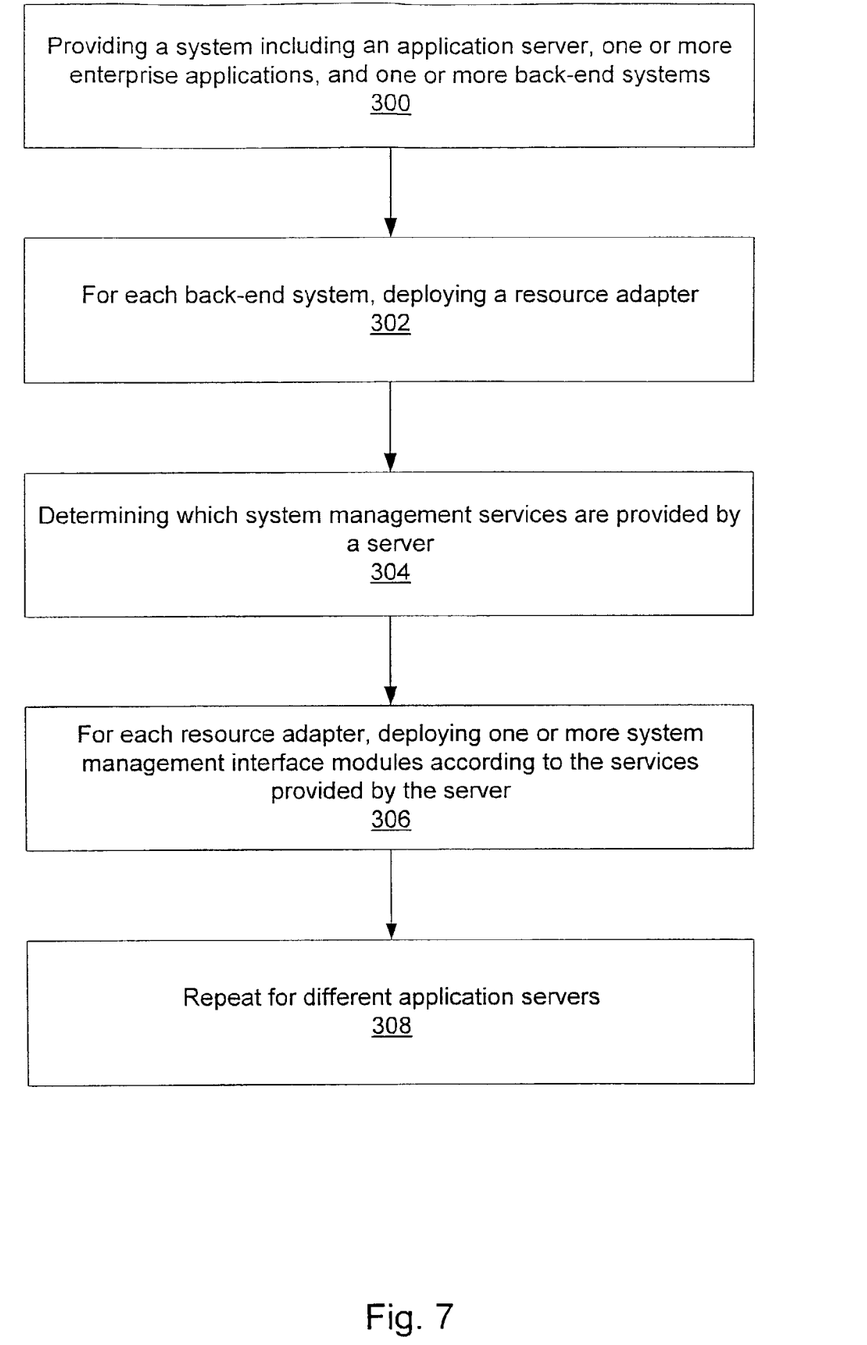
FIG. 7 illustrates a method of deploying an enterprise information system including resource adapters with modular system management interfaces, according to one embodiment.

FIG. 7 illustrates a method of deploying an enterprise information system including resource adapters with modular system management interfaces according to one embodiment. The method may comprise providing a system that may include an application server, one or more enterprise applications, and one or more back-end systems as indicated at 300. The application server may host the enterprise applications within application component containers. In another embodiment, the enterprise applications may be autonomous. The application server may also host one or more system management services. The application server may provide only a semi-managed framework. For example, the application server may not be fully J2EE compliant. In another embodiment, the application server may conform to the J2EE standard.

The method may comprise deploying a resource adapter for each back-end system as indicated at 302. A particular resource adapter may comprise a back-end system specific interface, a client interface, and a modular system management interface. The resource adapter may provide a standard interface for enterprise applications to access functions or data in the back-end system. The back-end system specific interface may provide the client interface and the modular system management interface access to the back-end system. The back-end system specific interface may be implemented as a system-level software driver. The back-end system specific interface may be specific to a particular type of different back-end system. The client interface and the modular system management interface may not be specific to particular types of back-end systems. The client interface allows enterprise applications access to the back-end system's data and functionality. The client interface may be implemented according to an industry standard, and may not be specific to any particular type of enterprise application.

The modular system management interface may provide system management services to the back-end system. The modular system management interface may include one or more sockets. For each service provided by an application server, a system management interface module may be plugged into one of the sockets. The system management interface module provides an interface to the management service for applying the system management service to accesses between enterprise applications and the back-end system. Hence, the deployment method may include determining what system management service are provided by one of the servers coupled to the one or more back-end systems as indicated at 304.

For each resource adapter, one or more system management interfaces modules, each corresponding to a particular service provided by the server, may be deployed as indicated at 306. For each application server differing in which services provided, the modular system management interface may differ in which modules are included. Thus, the resource adapters of a single server may differ only in the back-end system specific interface. All the resource adapters of a single server may comprise identical modular system management interfaces and client interfaces. The deployment method may be repeated for other application servers as indicated at 308. Thus, resource adapters for other configurations of application servers may employ a different set of modules in the system management interfaces depending on the services the application servers provide to the back-end systems.

Note that the method described in FIG. 7 is exemplary and not intended to be limiting. The method may be implemented in software, hardware, or a combination thereof. The order of method may be changed, and various elements may be added, reordered, combined, omitted, modified, etc.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense. It is intended that the following claims be interpreted to embrace all such variations and modifications.

What is claimed is:

1. A system, comprising:
   one or more computers configured to implement:
   an application;
   a server configured to provide a plurality of system management services;
   a back-end system; and
   a resource adapter coupled to said application, said server, and said back-end system, wherein said resource adapter is configured to provide an interface for said application to access a function or data of said back-end system, and wherein said resource adapter comprises a plurality of separately pluggable system management interface modules, wherein each separately pluggable system management interface module is configured to provide the resource adapter with a separate interface to a different one of said system management services, wherein each separate interface enables the respective system management service to be applied to interactions between said application and said back-end system, wherein said plurality of system management services are external to the resource adapter; and
   wherein one of said one or more system management services is a transaction management service, and wherein one of said one or more separately pluggable system management interface modules is a transaction management interface module configured to provide an interface to utilize said transaction management service for interactions between said application and said back-end system.

2. The system as recited in claim 1, wherein said back-end system is one of a plurality of back-end systems, and said resource adapter is one of a plurality of resource adapters, wherein each resource adapter is configured to provide a standard application interface for accessing a specific one of the back-end systems.

3. The system as recited in claim 1, wherein said server comprises an application server.

4. The system as recited in claim 1, wherein said server comprises a web server.

5. The system as recited in claim 1, wherein one of said one or more system management services is a connection management service, and wherein one of said one or more system management interface modules is a connection management interface module configured to provide an interface to utilize said connection management service for interactions between said application and said back-end system.

6. The system as recited in claim 5, wherein said connection management interface module is configured as a separate pluggable module in said resource adapter for providing a standard interface for connection management services.

7. The system as recited in claim 5, wherein said connection management service is configured to provide connection pooling to said back-end system.

8. The system as recited in claim 1, wherein said transaction management interface module is configured as a separate pluggable module in said resource adapter for providing a standard interface for transaction management services.

9. The system as recited in claim 1, wherein one of said one or more system management services is a security management service, and wherein one of said one or more system management interface modules is a security management interface module configured to provide an interface to utilize said security management service for interactions between said application and said back-end system.

10. The system as recited in claim 9, wherein said security management interface module is configured as a separate pluggable module in said resource adapter for providing a standard interface for security management services.

11. The system as recited in claim 1, wherein said back-end system is an enterprise resource planning (ERP) system.

12. The system as recited in claim 1, wherein said back-end system is a transaction processing (TP) system.

13. The system as recited in claim 1, wherein said back-end system is a database system.

14. A device, comprising:
    a processor; and
    memory coupled to said processor, wherein the memory is configured to store program instructions executable by the processor to implement a resource adapter comprising:
    an application client interface for coupling to one or more client applications;
    a back-end system interface configured to provide an interface for a particular back-end system; and
    a modular system management interface for coupling to a server, wherein the modular system management interface is configured to include a separately pluggable system management interface module for each of a plurality of system management services provided by the server, wherein each separately pluggable system management interface module is coupled to the application client interface and the back-end system interface, and wherein each separately pluggable system management interface module is configured to provide said resource adapter with a separate interface to a different one of said plurality of system management services provided by the server, wherein each separate interface enables the respective system management service to be applied to interactions between the one or more client applications and the particular back-end system, wherein said plurality of system management services are external to the resource adapter;
    wherein one of said one or more system management services is a connection management service configured to provide connection pooling to said back-end system, and wherein one of said one or more separately pluggable system management interface modules is a connection management interface module configured to provide an interface to utilize said connection management service for interactions between said application and said back-end system.

15. The device as recited in claim 14, wherein one of the system management interface modules is configured to provide an interface to a server transaction management service for accesses between the one or more client applications and the back-end system.

16. The device as recited in claim 14, wherein one of the system management interface modules is configured to provide an interface to a server security management service for accesses between the one or more client applications and the back-end system.

17. The device as recited in claim 14, wherein the back-end system interface is configured to interface with an enterprise resource planning (ERP) system.

18. The device as recited in claim 14, wherein the back-end system interface is configured to interface with a transaction processing (TP) system.

19. The device as recited in claim 14, wherein the back-end system interface is configured to interface with a database system.

20. A method for providing connectivity between one or more enterprise applications, servers and back-end systems, the method comprising:
  for each of one or more back-end systems, deploying a resource adapter, wherein each resource adapter is configured to provide a standard interface for enterprise applications to access one or more functions or data in the corresponding back-end system;
  determining a plurality of system management services provided by a first server coupled to the one or more back-end systems; and
  for each resource adapter, deploying one or more separately pluggable system management interface modules, wherein a different separately pluggable system interface module is deployed with the resource adapter for each of said plurality of system management services provided by the first server coupled to the one or more back-end systems, wherein each separately pluggable system management interface module is deployed as a separate pluggable module configured to:
    provide its respective resource adapter with a separate interface to a particular one of said plurality of system management services provided by the first server; and
    enable said particular system management service to be applied to interactions between an enterprise application and the back-end system corresponding to the respective resource adapter, wherein said plurality of system management services are external to the resource adapter;
  wherein one of said plurality of system management services is a security management service, and wherein one of said one or more separately pluggable system management interface modules is a security management interface module configured to provide a standard interface to utilize said security management service for interactions between said application and said back-end system.

21. The method as recited in claim 20, further comprising:
  deploying one or more second resource adapters for interfacing to a second server;
  determining a plurality of system management services provided by the second server, wherein the second server is coupled to one or more of the back-end systems, and wherein the second server provides a different set of management services than the first server; and
  for each second resource adapter, deploying one or more system management interface modules, wherein a different system interface module is deployed with the second resource adapter for each of said plurality of system management services provided by the second server, wherein each of the separately pluggable system management interface modules is deployed as a separate pluggable module configured to:
    provide its corresponding resource adapter with a separate interface to the corresponding system management service provided by the second server; and
    enable the corresponding system management service to be applied to interactions between an enterprise application and the back-end system corresponding to the second resource adapter wherein said plurality of system management services provided by the second server are external to the resource adapter.

22. The method as recited in claim 21, wherein the first server comprises an application server.

23. The method as recited in claim 21, wherein the first server comprises a web server.

24. The method as recited in claim 21, wherein said deploying one or more system management interface modules comprises deploying a connection management interface module, wherein the connection management interface module is deployed with the resource adapter for a connection management service provided by the first server, wherein the connection management interface module is deployed as a separate pluggable module to its resource adapter for providing a standard interface to the connection management service.

25. The method as recited in claim 24, wherein said connection management service is configured to provide connection pooling to a back-end system.

26. The method as recited in claim 21, wherein said deploying one or more system management interface modules comprises deploying a transaction management interface module, wherein the transaction management interface module is deployed with the resource adapter for a transaction management service provided by the first server, wherein the transaction management interface module is deployed as a separate pluggable module to its resource adapter for providing a standard interface to the transaction management service.

27. The method as recited in claim 21, wherein the back-end systems comprise one or more enterprise resource planning (ERP) systems.

28. The method as recited in claim 21, wherein the back-end systems comprise one or more transaction processing (TP) systems.

29. The method as recited in claim 21, wherein the back-end systems comprise a database system.

30. A tangible computer readable storage medium, comprising program instructions, wherein the program instructions are computer-executable to implement:
  an application client interface for coupling to one or more client applications;
  a back-end system interface configured to provide an interface for a particular back-end system; and
  a modular system management interface for coupling to a server, wherein the modular system management interface is configured to include a separately pluggable system management interface module for each of a plurality of system management services provided by the server, wherein each separately pluggable system management interface module is coupled to the application client interface and the back-end system interface, and wherein each separately pluggable system management interface module is configured to provide said resource adapter with a separate interface to a different one of said plurality of system management services provided by the server, wherein each separate interface enables the respective system management service to be applied to interactions between the one or more client applications and the particular back-end system, wherein said plurality of system management services are external to the resource adapter;
  wherein one of the separately pluggable system management interface modules is a transaction management interface module configured to provide an interface to a server transaction management service for accesses between the one or more client applications and the back-end system.

31. The tangible computer readable storage medium as recited in claim 30, wherein one of the system management interface modules is configured to provide an interface to a server connection management service for accesses between the one or more client applications and the back-end system.

32. The tangible computer readable storage medium as recited in claim 30, wherein one of the system management interface modules is configured to provide an interface to a server security management service for accesses between the one or more client applications and the back-end system.

33. The tangible computer readable storage medium as recited in claim 30, wherein the back-end system interface is configured to interface with an enterprise resource planning (ERP) system.

34. The tangible computer readable storage medium as recited in claim 30, wherein the back-end system interface is configured to interface with a transaction processing (TP) system.

35. The tangible computer readable storage medium as recited in claim 30, wherein the back-end system interface is configured to interface with a database system.

* * * * *